(12) United States Patent
Chida et al.

(10) Patent No.: US 11,646,474 B2
(45) Date of Patent: May 9, 2023

(54) SECONDARY BATTERY MODULE

(71) Applicant: Vehicle Energy Japan Inc., Hitachinaka (JP)

(72) Inventors: Koji Chida, Hitachinaka (JP); Yasuyuki Aizawa, Hitachinaka (JP); Masatake Fuke, Hitachinaka (JP)

(73) Assignee: Vehicle Energy Japan, Inc., Hitachinaka (JP)

( * ) Notice: Subject to any disclaimer, the term of this patent is extended or adjusted under 35 U.S.C. 154(b) by 0 days.

(21) Appl. No.: 17/059,976

(22) PCT Filed: Feb. 25, 2019

(86) PCT No.: PCT/JP2019/007086
§ 371 (c)(1),
(2) Date: Nov. 30, 2020

(87) PCT Pub. No.: WO2019/244402
PCT Pub. Date: Dec. 26, 2019

(65) Prior Publication Data
US 2021/0218114 A1    Jul. 15, 2021

(30) Foreign Application Priority Data

Jun. 22, 2018   (JP) .............................. JP2018-118425

(51) Int. Cl.
*H01M 50/502* (2021.01)
*H01M 50/262* (2021.01)
(Continued)

(52) U.S. Cl.
CPC ....... *H01M 50/502* (2021.01); *H01M 50/204* (2021.01); *H01M 50/209* (2021.01);
(Continued)

(58) Field of Classification Search
CPC ............ H01M 50/502; H01M 50/262; H01M 50/543; H01M 50/244; H01M 50/204
See application file for complete search history.

(56) References Cited

U.S. PATENT DOCUMENTS

| 2013/0252052 A1 | 9/2013 | Dawley |
| 2014/0065467 A1 | 3/2014 | Choi et al. |

(Continued)

FOREIGN PATENT DOCUMENTS

| CN | 103650209 A | 3/2014 |
| CN | 105359330 A | 2/2016 |

(Continued)

OTHER PUBLICATIONS

International Search Report (PCT/ISA/210) issued in PCT Application No. PCT/JP2019/007086 dated May 28, 2019 with English translation (two (2) pages).

(Continued)

*Primary Examiner* — Jane J Rhee
(74) *Attorney, Agent, or Firm* — Crowell & Moring LLP

(57) ABSTRACT

A secondary battery module includes a plurality of battery blocks each obtained by stacking a plurality of battery cells. The secondary battery module includes a holding member adapted to hold the plurality of battery blocks and including a pair of opposed end plates, a pair of opposed side plates, and a section plate arranged between the adjacent battery blocks to partition the battery blocks; and an inter-block bus bar provided across the section plate and adapted to electrically connect the adjacent battery blocks. The inter-block bus bar has a fuse portion.

9 Claims, 7 Drawing Sheets

(51) Int. Cl.
*H01M 50/543* (2021.01)
*H01M 50/244* (2021.01)
*H01M 50/204* (2021.01)
*H01M 50/50* (2021.01)
*H01M 50/296* (2021.01)
*H01M 50/291* (2021.01)
*H01M 50/583* (2021.01)
*H01M 50/209* (2021.01)

(52) U.S. Cl.
CPC ....... *H01M 50/244* (2021.01); *H01M 50/262* (2021.01); *H01M 50/291* (2021.01); *H01M 50/296* (2021.01); *H01M 50/50* (2021.01); *H01M 50/543* (2021.01); *H01M 50/583* (2021.01)

(56) References Cited

U.S. PATENT DOCUMENTS

| | | | |
|---|---|---|---|
| 2014/0356671 A1 | 12/2014 | Dawley et al. | |
| 2016/0036102 A1* | 2/2016 | Suzuki | H01M 10/6567 429/120 |
| 2016/0126514 A1* | 5/2016 | Suzuki | H01M 50/209 429/154 |
| 2018/0109016 A1* | 4/2018 | Fees | H01R 11/281 |

FOREIGN PATENT DOCUMENTS

| | | |
|---|---|---|
| DE | 10 2015 113 374 A1 | 2/2016 |
| EP | 2 698 847 A1 | 2/2014 |
| JP | 2009-289431 A | 12/2009 |
| JP | 2012-138239 A | 7/2012 |
| JP | 2012-181977 A | 9/2012 |
| JP | 2013-73929 A | 4/2013 |
| JP | 2013-196932 A | 9/2013 |
| JP | 2013-222554 A | 10/2013 |
| JP | 2014-229384 A | 12/2014 |
| JP | 2017-123280 A | 7/2017 |

OTHER PUBLICATIONS

Japanese-language Written Opinion (PCT/ISA/237) issued in PCT Application No. PCT/JP2019/007086 dated May 28, 2019 (three (3) pages).
Chinese-language Office Action issued in Chinese Application No. 201980035841.7 dated Jun. 17, 2022 (seven (7) pages).
Extended European Search Report issued in European Application No. 19822527.8 dated Mar. 18, 2022 (seven (7) pages).
Chinese-language Office Action issued in Chinese Application No. 201980035841.7 dated Mar. 22, 2023 (five (5) pages).

* cited by examiner

SECONDARY BATTERY MODULE

TECHNICAL FIELD

The present invention relates to secondary battery modules.

The present application claims priority from Japanese patent application No. 2018-118425 filed on Jun. 22, 2018, the entire content of which is hereby incorporated by reference into this application.

BACKGROUND ART

Conventionally, a secondary battery module obtained by stacking a plurality of battery cells is known as a technique in such a field. In such a secondary battery module, the battery cells are electrically connected by bus bars. In addition, to prevent damage to the battery cells due to an abnormal overcurrent, a bus bar with a so-called fuse function is adopted by providing one of the plurality of bus bars with a fuse portion.

For example, Patent Literature 1 below discloses a secondary battery module having a bus bar with a fuse function that has a small cross-section portion (i.e., a fuse portion) with a cross-section smaller than those of the other portions. When an abnormal overcurrent flows through the bus bar, the fuse portion is allowed to fuse through generation of heat, thereby protecting the battery cells.

CITATION LIST

Patent Literature

Patent Literature 1: JP 2013-73929 A

SUMMARY OF INVENTION

Technical Problem

However, since the fuse portion of the aforementioned bus bar with a fuse function is formed thinner or narrower than the other portions, there has been a problem that when an external force, such as vibration or impact, is applied to the fuse portion, stress concentration is likely to occur in the fuse portion, which can break the fuse portion.

The present invention has been made to solve such a technical problem, and it is an object of the present invention to provide a secondary battery module in which stress applied to a fuse portion can be reduced and thus breakage of the fuse portion can be suppressed.

Solution to Problem

A secondary battery module according to the present invention is a secondary battery module with a plurality of battery blocks each obtained by stacking a plurality of battery cells, including a holding member adapted to hold the plurality of the battery blocks, the holding member including a pair of opposed end plates, a pair of opposed side plates, and a section plate arranged between the adjacent battery blocks to partition the battery blocks; and an inter-block bus bar provided across the section plate and adapted to electrically connect the adjacent battery blocks, in which the inter-block bus bar has a fuse portion.

In addition, a secondary battery module according to the present invention is a secondary battery module with at least one battery block obtained by stacking a plurality of battery cells, including a holding member adapted to hold the battery block, the holding member including a pair of opposed end plates and a pair of opposed side plates; and a plurality of bus bars at ends of the module, each of the plurality of bus bars at the ends of the module having one end electrically connected to the battery block and having another end extending toward one of the end plates or one of the side plates and electrically connected to an external connection terminal of the module, in which at least one of the plurality of bus bars at the ends of the module has a fuse portion.

Advantageous Effects of Invention

According to the present invention, stress applied to a fuse portion can be reduced, and thus breakage of the fuse portion can be suppressed.

DESCRIPTION OF EMBODIMENTS

Figure 1:
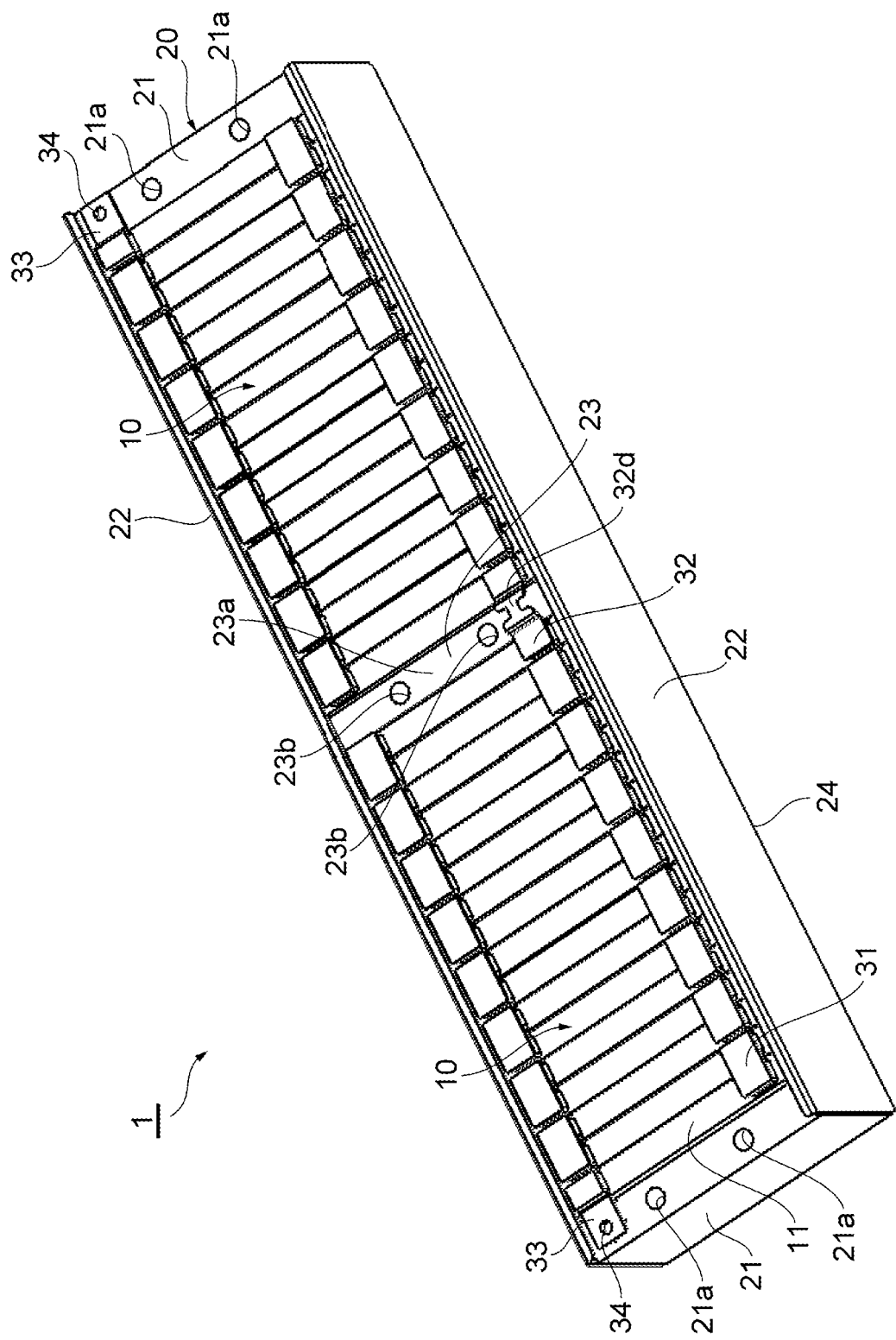
FIG. 1 is a perspective view of a secondary battery module according to a first embodiment.

Hereinafter, embodiments of a secondary battery module according to the present invention will be described with reference to the drawings. In the description of the drawings, identical elements are denoted by identical reference numerals, and overlapped descriptions will be omitted. In the following description, "the direction in which battery cells are stacked" may simply be referred to as "the stacked direction" to avoid complexity of description.

First Embodiment

Figure 2:
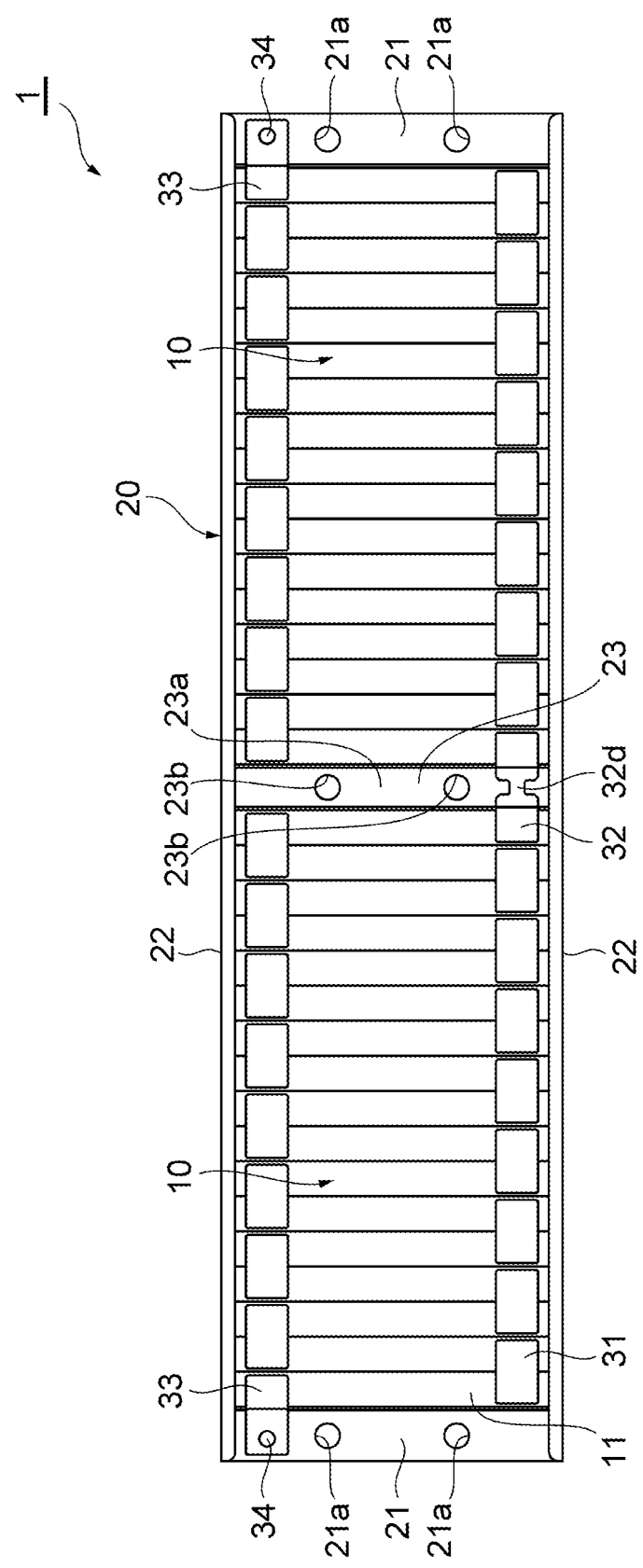
FIG. 2 is a plan view of the secondary battery module according to the first embodiment.

FIG. 1 is a perspective view of a secondary battery module according to a first embodiment. FIG. 2 is a plan view of the secondary battery module according to the first embodiment. The secondary battery module 1 of the present embodiment mainly includes two battery blocks 10 each obtained by stacking a plurality of battery cells 11 in a given direction, and a holding member 20 adapted to hold the two battery blocks 10 arranged in series in the stacked direction of the battery cells 11.

Each battery block 10 is formed by stacking a plurality of (herein, 17) flat rectangular battery cells 11 in the stacked direction with interposed therebetween cell holders (not illustrated) each made of an insulating resin material.

Figure 3:
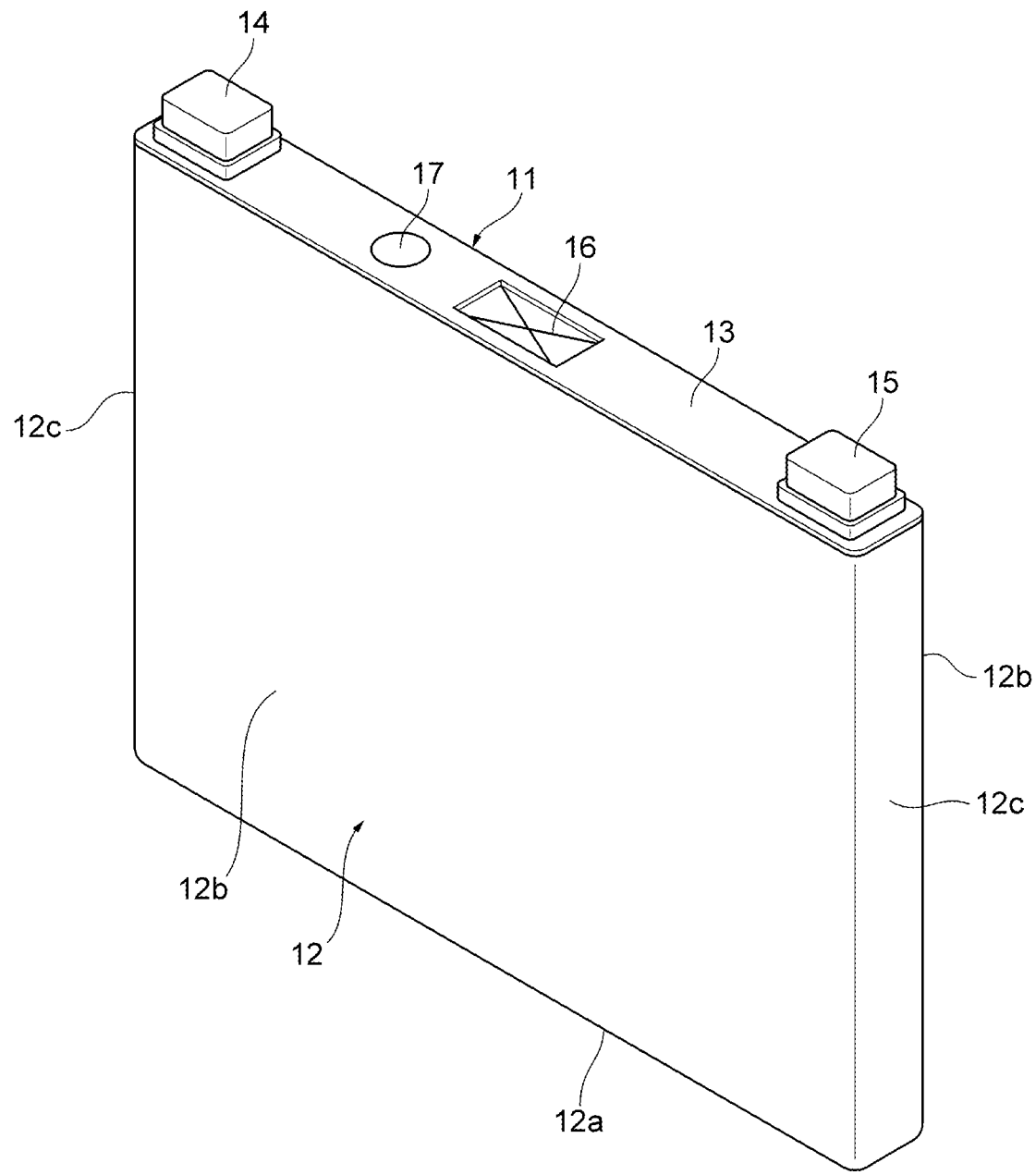
FIG. 3 is a perspective view of a battery cell.

FIG. 3 is a perspective view of each battery cell. As illustrated in FIG. 3, the battery cell 11 includes a cell can 12 and a cell lid 13. The cell can 12 has a so-called closed-bottomed rectangular tube shape, and includes a rectangular can bottom portion 12a; and a pair of opposed wide side face portions 12b and a pair of opposed narrow side face portions 12c arranged in upright position on the four sides of the can bottom portion 12a, the pair of wide side face portions 12b having relatively large areas, and the pair of narrow side face portions 12c having relatively small areas. The cell can 12 houses a flat wound electrode group and an electrolytic solution, for example.

The cell lid 13 is approximately rectangular in shape, and is joined to the cell can 12 so as to cover the opening of the cell can 12. Examples of the joining method include laser welding. The cell lid 13 has a positive electrode terminal 14 and a negative electrode terminal 15 each provided in a protruding manner. Each of the positive electrode terminal 14 and the negative electrode terminal 15 has an end that is formed flat so as to be easily joined to an inter-cell bus bar 31, an inter-block bus bar 32, or a bus bar 33 at an end of the module (described below) by laser welding.

The cell lid 13 is provided with a gas exhaust valve 16. When the pressure in the battery cell 11 has increased, the gas exhaust valve 16 is opened to discharge the gas in the battery cell 11. Accordingly, the pressure in the battery cell 11 can be reduced, and thus the safety of the battery cell 11 can be secured. Further, the cell lid 13 is provided with a liquid inlet plug 17 for closing a liquid inlet for an electrolytic solution. The liquid inlet plug 17 is joined to the cell lid 13 by laser welding after the battery cell 11 is filled with an electrolytic solution via the liquid inlet, for example.

The plurality of battery cells 11 each having the aforementioned structure are stacked while being alternately inverted by 180° such that the positive electrode terminal 14 of one of the mutually adjacent battery cells 11 is adjacent to the negative electrode terminal 15 of the other battery cell 11. In addition, the positive electrode terminal 14 of one of the mutually adjacent battery cells 11 is electrically connected to the negative electrode terminal 15 of the other battery cell 11 by an inter-cell bus bar 31. The inter-cell bus bar 31 is formed flat using an aluminum material, for example, and is joined to the positive electrode terminal 14 and the negative electrode terminal 15 by laser welding while being placed on the positive electrode terminal 14 and the negative electrode terminal 15 so as to cover them.

The holding member 20 is formed in the shape of a box having an open upper face, for example, and includes a rectangular bottom plate portion 24; a pair of end plates 21 and a pair of side plates 22 arranged in upright position on the four sides of the bottom plate portion 24; and a section plate 23 disposed in a space formed by the bottom plate portion 24, the end plates 21, and the side plates 22.

The pair of end plates 21 are arranged on the opposite sides of the battery cells 11 in the stacked direction so as to face each other. Each end plate 21 is formed with a metallic material, for example, extends in a direction orthogonal to the stacked direction of the battery cells 11, and has a predetermined width in the stacked direction. Each end plate 21 has two screw holes 21a with a predetermined distance therebetween. The end plates 21 are fastened to a housing 40 together with the bottom plate portion 24 using screws 25 inserted through the screw holes 21a (see FIG. 6). The screws 25 are fastening members for fastening the end plates 21 to the housing 40 as described below.

The pair of side plates 22 are formed thinner than the end plates 21, and extend along the stacked direction. The side plates 22 are formed integrally with the bottom plate portion 24 by, for example, bending a single metal plate in a squared U-shape. It should be noted that the side plates 22 may also be formed separately from the bottom plate portion 24 and then fixed thereto by welding or with screws, for example.

Meanwhile, the section plate 23 is disposed between the battery blocks 10 so as to partition them, and is provided in parallel with the end plates 21. The section plate 23 is cuboid in shape, and has a relatively narrow portion along the stacked direction of the battery cells 11. Therefore, as illustrated in FIGS. 1 and 2, the upper surface of the section plate 23 is a narrow face 23a arranged along the stacked direction.

The section plate 23 has two screw holes 23b with a predetermined distance therebetween. The section plate 23 is fastened to the housing 40 together with the bottom plate portion 24 using screws 25 inserted through the screw holes 23b (see FIG. 6). The screws 25 are fastening members for fastening the section plate 23 to the housing 40 as described below.

The secondary battery module 1 of present embodiment further includes, in addition to the aforementioned inter-cell bus bars 31, an inter-block bus bar 32 adapted to electrically connect the adjacent battery blocks 10, and bus bars 33 at opposite ends of the module, each bus bar 33 at an end of the module being adapted to electrically connect the positive electrode terminal 14 or the negative electrode terminal 15 of one of the battery cells 11 of each battery block 10 to an external connection terminal 34 of the module arranged near each end plate 21.

The inter-block bus bar 32 is provided across the section plate 23, and electrically connects the positive electrode terminal 14 of one of the mutually adjacent battery blocks 10 to the negative electrode terminal 15 of the other battery block 10.

Figure 4:
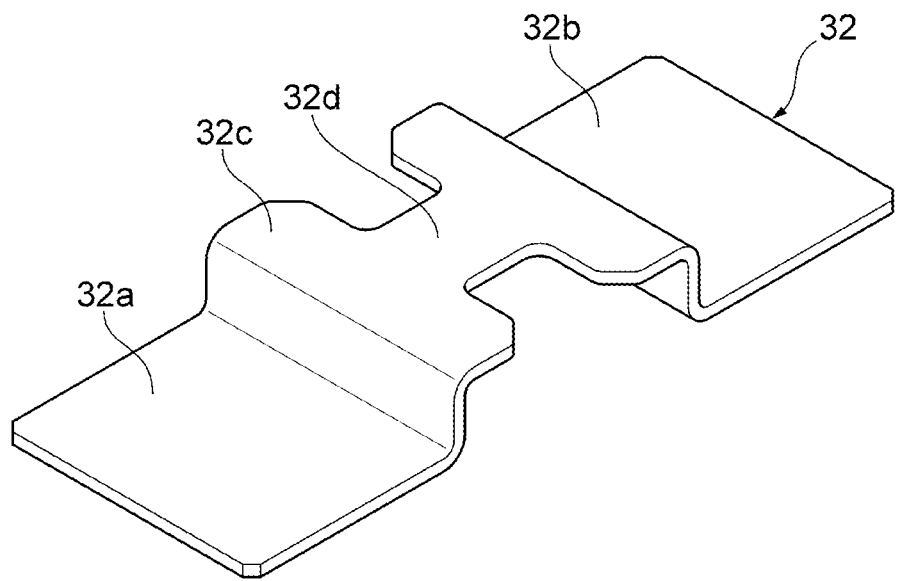
FIG. 4 is a perspective view of an inter-block bus bar.

FIG. 4 is a perspective view of the inter-block bus bar. As illustrated in FIG. 4, the inter-block bus bar 32 has a cross-section in an approximately hat shape, and includes a flat joint portion 32a adapted to be joined to one of the positive electrode terminal 14 or the negative electrode terminal 15 of one of the mutually adjacent battery blocks 10, a flat joint portion 32b adapted to be joined to the other of the positive electrode terminal 14 or the negative electrode terminal 15 of the other battery block 10, and a protruding portion 32c arranged between the joint portions 32a and 32b and protruding outward from the battery cells 11. The center of the protruding portion 32c is provided with a fuse portion 32d that is formed narrower than the other portions of the inter-block bus bar 32. That is, the inter-block bus bar 32 is a bus bar with a fuse function. It should be noted that the fuse portion 32d is arranged in the center of the protruding portion 32c so as to face the narrow face 23a of the section plate 23.

The inter-block bus bar 32 with such a structure is formed by, for example, machining a part of a single aluminum plate into a narrow shape at a place where the fuse portion 32d is to be formed, and bending the plate into a hat shape. It should be noted that the inter-block bus bar 32 may also be formed using a clad material obtained by joining the protruding portion 32c made of aluminum to the joint portions 32a and 32b each made of copper.

Meanwhile, each bus bar 33 at an end of the module has a plate shape, and one end of the bus bar 33 is electrically connected to the positive electrode terminal 14 or the negative electrode terminal 15 of the battery cell 11 that is most adjacent to one of the end plates 21, while the other end of the bus bar 33 extends toward the end plate 21 and is electrically connected to the external connection terminal 34 of the module.

Figure 5:
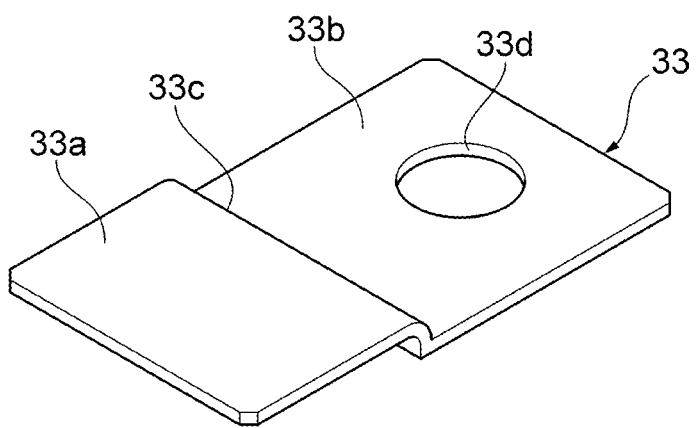
FIG. 5 is a perspective view of a bus bar at an end of the module.

FIG. 5 is a perspective view of each bus bar at an end of the module. As illustrated in FIG. 5, each bus bar 33 at an end of the module is formed by, for example, bending a single aluminum plate into an approximately Z-shape, and includes a joint portion 33a adapted to be joined to the positive electrode terminal 14 or the negative electrode terminal 15 of the battery cell 11 that is most adjacent to one of the end plates 21 and arranged at a relatively high level, an extension portion 33b arranged at a relatively low level and extending toward the end plate 21, and a step portion 33c arranged between the joint portion 33a and the extension portion 33b. The tip end of the extension portion 33b is provided with a screw hole 33d. The aforementioned external connection terminal 34 of the module is screwed into the screw hole 33d and thus is fixed to the bus bar 33 at the end of the module.

Each bus bar 33 at an end of the module is fixed to one of the battery cells 11 as the joint portion 33a of the bus bar 33 is welded to the positive electrode terminal 14 or the negative electrode terminal 15 of the battery cell 11. Though not illustrated, in a state in which the bus bar 33 at the end of the module is fixed to the battery cell 11, the bottom face of the extension portion 33b of the bus bar 33 is away from the upper face of the end plate 21 and thus is electrically insulated from the end plate 21. Similarly, the bottom face of the external connection terminal 34 of the module screwed into the screw hole 33d of the bus bar 33 at the end of the module is away from the upper face of the end plate 21 and thus is electrically insulated from the end plate 21.

The bus bar 33 at an end of the module with such a structure is provided on each of the opposite sides of the secondary battery module 1 in the stacked direction. That is, one of the bus bars 33 is adapted to electrically connect the positive electrode terminal 14 of the battery cell 11 located at one end in the stacked direction to one external connection terminal 34 of the module, and the other bus bar 33 is adapted to electrically connect the negative electrode terminal 15 of the battery cell 11 located at the other end in the stacked direction to the other external connection terminal 34 of the module. In addition, the external connection terminal 34 of the module, which is electrically connected to the positive electrode terminal 14 of the battery cell 11 via the bus bar 33 at one end of the module, functions as a positive electrode of the external connection terminal of the secondary battery module 1. Meanwhile, the external connection terminal 34 of the module, which is electrically connected to the negative electrode terminal 15 of the battery cell 11 via the bus bar 33 at an end of the module, functions as a negative electrode of the external connection terminal of the secondary battery module 1.

In the secondary battery module 1 according to the present embodiment, the inter-block bus bar 32 is provided across the section plate 23, and the inter-block bus bar 32 is provided with the fuse portion 32d. The section plate 23 partially forms the holding member 20 and is a portion with a relatively high strength in the secondary battery module 1. As the inter-block bus bar 32, which has the fuse portion 32d, is provided near the section plate 23 with a relatively high strength, stress applied to the fuse portion 32d can be reduced, and thus breakage of the fuse portion 32d due to external forces, such as vibration or impact, can be suppressed.

In addition, since the fuse portion 32d is provided in the inter-block bus bar 32 so as to face the narrow face 23a of the section plate 23, stress applied to the fuse portion 32d can be reduced, and in comparison with when the fuse portion 32d is provided facing the wide face (that is, a face extending in the longitudinal direction) of the section plate 23, for example, the protruding portion 32c of the inter-block bus bar 32 can be made shorter. Consequently, the material used for the inter-block bus bar 32 can be reduced, and a cost reduction can thus be achieved.

Figure 6:
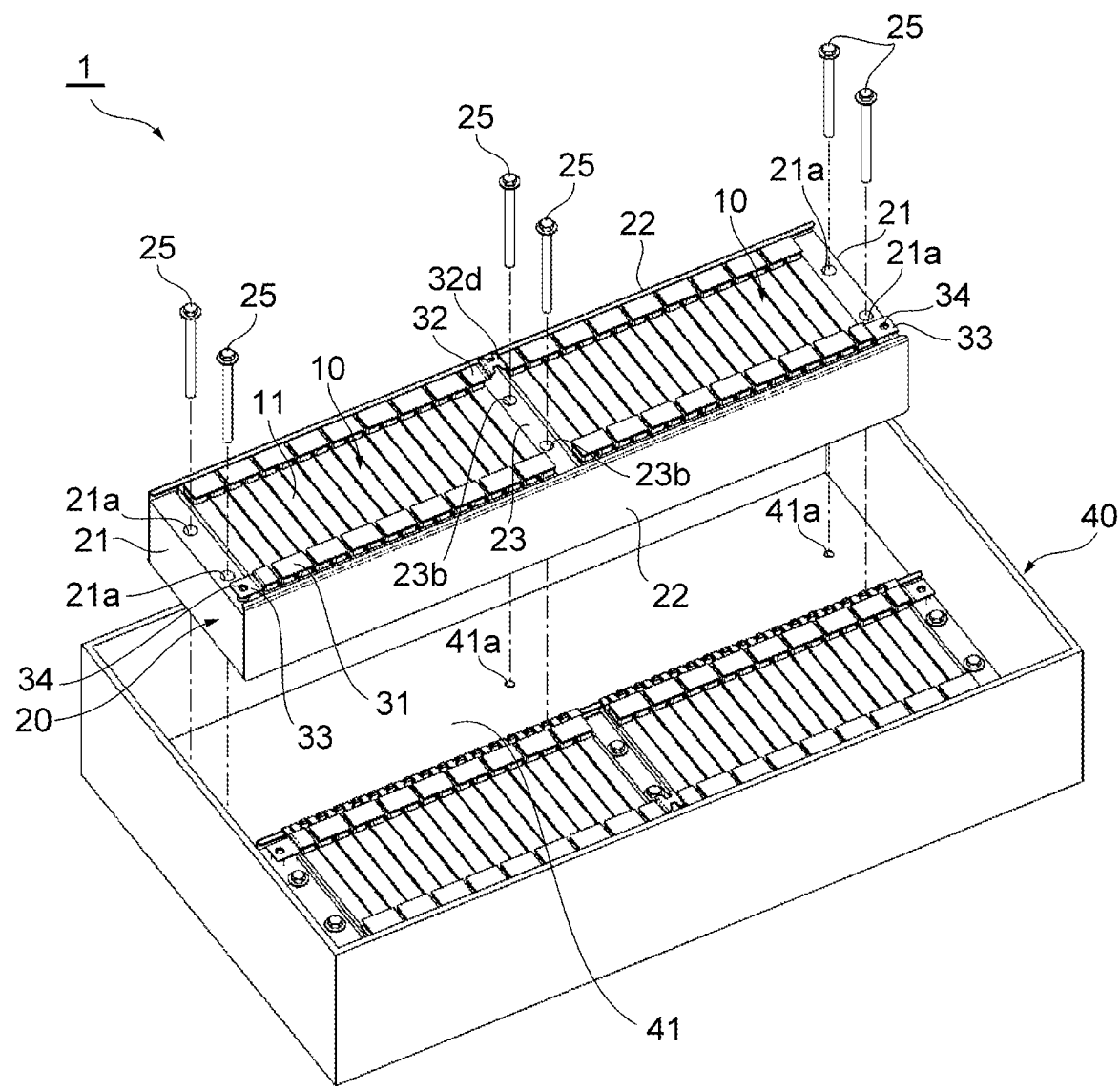
FIG. 6 is a schematic perspective view of battery blocks, which are held by a holding member, housed in a housing.

Herein, when a housing adapted to house the battery blocks 10, which are held by the holding member 20, is provided, a fastening member for fastening the section plate 23 to the housing is preferably disposed near the fuse portion 32d. Specifically, as illustrated in FIG. 6, for example, the secondary battery module 1 further includes a housing 40 adapted to house the battery blocks 10 held by the holding member 20. The housing 40 is in the shape of a box, and houses two battery blocks 10 held by the holding member 20. Although FIG. 6 illustrates the housing 40 without a cover, the housing 40 may include a cover.

As illustrated in FIG. 6, a bottom portion 41 of the housing 40 is provided with screw holes 41a corresponding to the screw holes 21a of the end plates 21 and the screw holes 23b of the section plate 23. The inner wall of each screw hole 21a has an inside screw formed therein. The battery blocks 10 held by the holding member 20 are fastened to the housing 40 with the screws 25 that have been inserted through the screw holes 21a and 23b and further through the screw holes 41a.

At this time, the screws 25 for fastening the section plate 23 to the housing 40 are disposed near the fuse portion 32d. Accordingly, the effect of reducing the stress applied to the fuse portion 32d can be further increased. Thus, breakage of the fuse portion 32d due to external forces, such as vibration or impact, can be suppressed.

Although the present embodiment has described an example in which the fuse portion 32d is formed narrower than the other portions of the inter-block bus bar 32, the fuse portion 32d may have the same width as the other portions of the inter-block bus bar 32 and be formed thinner than the other portions of the inter-block bus bar 32. Alternatively, the fuse portion 32d may be formed narrower and thinner than the other portions of the inter-block bus bar 32. In this manner, changing the configuration of the fuse portion 32d as appropriate can increase the versatility of the fuse portion 32d and save materials more easily.

Second Embodiment

Figure 7:
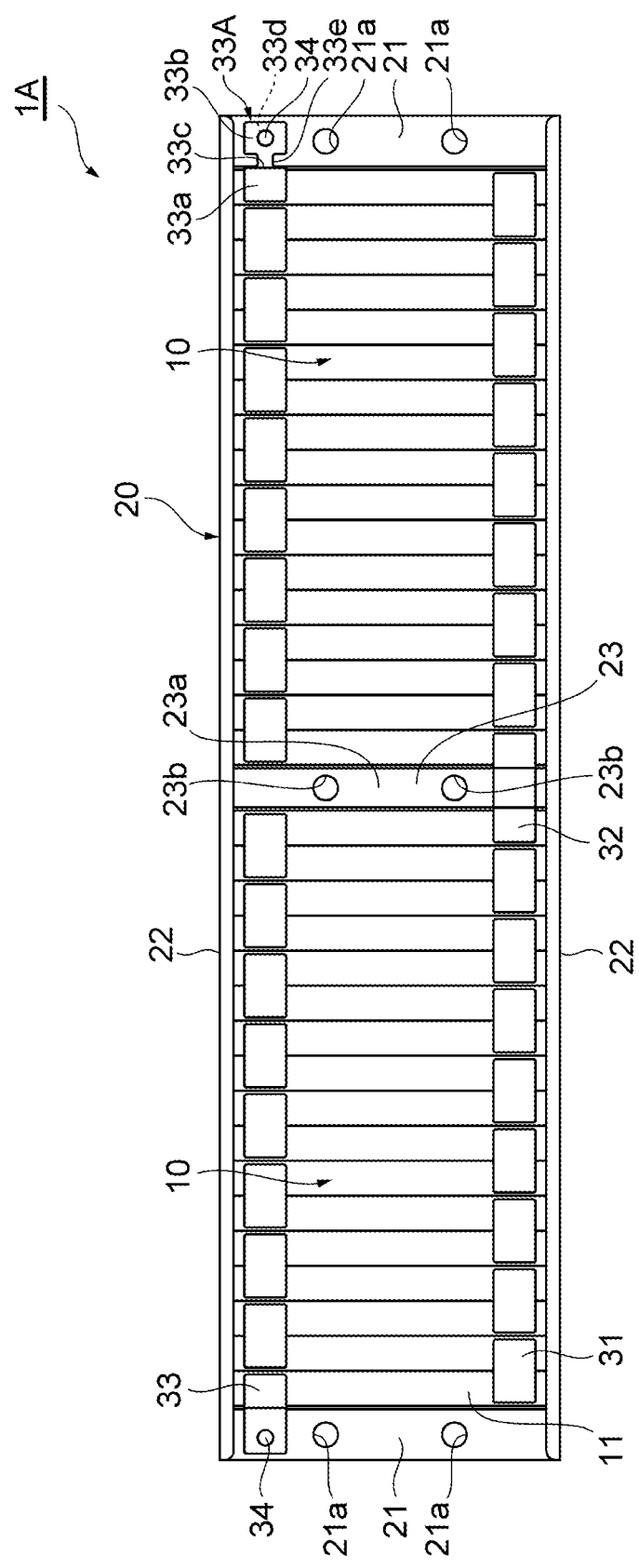
FIG. 7 is a plan view of a secondary battery module according to a second embodiment.

FIG. 7 is a plan view of a secondary battery module according to a second embodiment. A secondary battery module 1A of the present embodiment differs from the secondary battery module of the aforementioned first embodiment in that one of the two bus bars 33 at opposite ends of the module is a bus bar with a fuse function. The other structures are similar to those of the first embodiment. Thus, overlapped descriptions will be omitted.

As illustrated in FIG. 7, the inter-block bus bar 32 is not provided with the fuse portion 32d. Meanwhile, one of the two bus bars 33 at opposite ends of the module (i.e., the bus bar 33A at an end of the module on the right side in FIG. 7) is provided with a fuse portion 33e. The fuse portion 33e is formed between the screw hole 33d of the extension portion 33b and the step portion 33c, and is narrower than the other portions of the bus bar 33A at the end of the module. The bus bar 33A at the end of the module is formed by, for example, machining a part of a single aluminum plate into a narrow shape at a place where the fuse portion 33e is to be formed and forming the screw hole 33d, and then bending the plate into a Z-shape.

According to the secondary battery module 1A of the present embodiment, operational advantages similar to those of the aforementioned first embodiment can be obtained. That is, the end plates 21 partially form the holding member 20 and are portions with a relatively high strength in the secondary battery module 1. When the bus bar 33A at an end of the module, which has the fuse portion 33e, is provided near one of the end plates 21 with a relatively high strength, stress applied to the fuse portion 33e can be reduced, and thus breakage of the fuse portion 33e due to external forces, such as vibration or impact, can be suppressed.

In addition, in the present embodiment, a screw 25 for fastening the end plate 21 to the housing 40 is preferably disposed near the fuse portion 33e. Accordingly, the effect of reducing the stress applied to the fuse portion 33e can be further increased.

Although the present embodiment has described an example in which one of the two bus bars 33 at opposite ends of the module is a bus bar with a fuse function, both the two bus bars 33 at the opposite ends of the module may be bus bars each having a fuse function as appropriate, or alternatively, one of the two bus bars 33 at the opposite ends of the module may be a bus bar with a fuse function, and further, the inter-block bus bar 32 may also be a bus bar with a fuse function.

Third Embodiment

Figure 8:
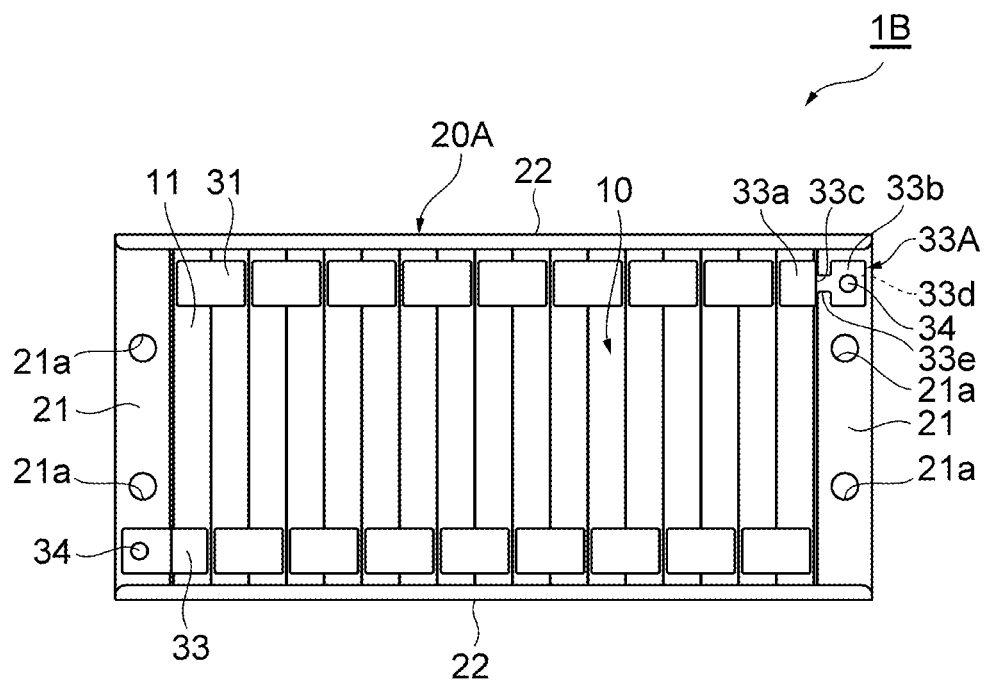
FIG. 8 is a plan view of a secondary battery module according to a third embodiment.

FIG. 8 is a plan view of a secondary battery module according to a third embodiment. A secondary battery module 1B of the present embodiment differs from the aforementioned second embodiment in having only one battery block 10. The other structures are similar to those of the second embodiment. Thus, overlapped descriptions will be omitted.

As illustrated in FIG. 8, the secondary battery module 1B includes one battery block 10 and a holding member 20A adapted to hold the battery block 10. Therefore, the holding member 20A does not include the section plate 23 described in the first and second embodiments. In addition, one of the two bus bars 33 at opposite ends of the module (the bus bar 33A at an end of the module on the right side in FIG. 8) is provided with the fuse portion 33e.

According to the secondary battery module 1B of the present embodiment, operational advantages similar to those of the second embodiment can be obtained.

Although the embodiments of the present invention have been described in detail above, the present invention is not limited thereto, and various designs changes can be made without departing from the spirit and scope of the present invention recited in the claims. For example, although the second and third embodiments have described examples in which the bus bars 33 at opposite ends of the module extend toward the end plates 21, the bus bars 33 at the opposite ends of the module may extend toward the side plates 22. In such a case, one of the external connection terminals 34 of the module may be fixed to the extension portion, which extends toward one of the side plates 22, of one of the bus bars 33 at the opposite ends of the module.

REFERENCE SIGNS LIST 1, 1A, 1B Secondary battery module
10 Battery block
11 Battery cell
20, 20A Holding member
21 End plate
21a Screw hole
22 Side plate
23 Section plate
23a Narrow face
23b Screw hole
24 Bottom plate portion
25 Screw (fastening member)
31 Inter-cell bus bar
32 Inter-block bus bar
32a, 32b, 33a Joint portion
32c Protruding portion
32d, 33e Fuse portion
33, 33A Bus bar at end of module
33b Extension portion
33c Step portion
33d Screw hole
34 External connection terminal of module
40 Housing

The invention claimed is:

1. A secondary battery module with a plurality of battery blocks each obtained by stacking a plurality of battery cells, comprising:
a holding member adapted to hold the plurality of the battery blocks, the holding member including a pair of opposed end plates, a pair of opposed side plates, and a section plate arranged between the adjacent battery blocks to partition the battery blocks, wherein the opposed side plates completely cover two ends of the section plate; and
an inter-block bus bar provided across the section plate and adapted to electrically connect the adjacent battery blocks,
wherein the inter-block bus bar has a fuse portion.

2. The secondary battery module according to claim 1, wherein:
the section plate has a narrow face arranged along a stacked direction of the battery cells, and
the fuse portion of the inter-block bus bar is provided so as to face the narrow face of the section plate.

3. The secondary battery module according to claim 1, wherein the fuse portion is formed narrower or/and thinner than other portions of the inter-block bus bar.

4. The secondary battery module according to claim 1, further comprising a housing adapted to house the plurality of the battery blocks held by the holding member,
wherein:
the section plate is fastened to the housing with a fastening member, and
the fastening member is disposed near the fuse portion.

5. A secondary battery module with at least one battery block obtained by stacking a plurality of battery cells, comprising:
a holding member adapted to hold the battery block, the holding member including a pair of opposed end plates, a pair of opposed side plates, and a section plate arranged between adjacent battery blocks to partition the battery blocks, wherein the opposed side plates completely cover two ends of the section plate;
a plurality of bus bars at ends of the module, each of the plurality of bus bars at the ends of the module having one end electrically connected to the battery block and having another end extending toward one of the end plates or one of the side plates and electrically connected to an external connection terminal of the module; and
an inter-block bus bar provided across the section plate and adapted to electrically connect the adjacent battery blocks,
wherein at least one of the plurality of bus bars at the ends of the module has a fuse portion.

6. The secondary battery module according to claim 5, wherein the fuse portion is formed narrower or/and thinner than other portions of the bus bar at the end of the module.

7. The secondary battery module according to claim 5, further comprising a housing adapted to house the battery block held by the holding member,
wherein:
each end plate or each side plate is fastened to the housing with a fastening member, and
the fastening member is disposed near the fuse portion.

8. The secondary battery module according to claim 1, wherein the inter-block bus bar has a cross-section in an approximately hat shape.

9. The secondary battery module according to claim 5, wherein the inter-block bus bar has a cross-section in an approximately hat shape.

\* \* \* \* \*